(12) United States Patent
Wang

(10) Patent No.: US 10,852,469 B2
(45) Date of Patent: Dec. 1, 2020

(54) DISPLAY PANEL

(71) Applicant: AU OPTRONICS CORPORATION, Hsin-Chu (TW)

(72) Inventor: Ying-Ming Wang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/284,117

(22) Filed: Feb. 25, 2019

(65) Prior Publication Data
US 2019/0278017 A1 Sep. 12, 2019

(30) Foreign Application Priority Data
Mar. 6, 2018 (TW) .............................. 107107489 A

(51) Int. Cl.
*F21V 8/00* (2006.01)
*G02F 1/1333* (2006.01)

(52) U.S. Cl.
CPC ........... *G02B 6/0088* (2013.01); *G02B 6/005* (2013.01); *G02F 1/133308* (2013.01); *G02F 2001/133314* (2013.01); *G02F 2001/133317* (2013.01)

(58) Field of Classification Search
CPC .. G02B 6/005; G02B 6/0088; G02F 1/133308
See application file for complete search history.

(56) References Cited

U.S. PATENT DOCUMENTS 7,864,261 B2 1/2011 Chen et al.
8,579,490 B2 11/2013 Komano
8,721,157 B2 5/2014 Hsiao et al.
8,870,439 B2 10/2014 Cheng
9,304,345 B2 4/2016 Kim
(Continued)

FOREIGN PATENT DOCUMENTS

CN 102089568 A 6/2011
CN 102418882 A 4/2012
(Continued)

OTHER PUBLICATIONS

CNIPA has issued the first office action for the corresponding China application dated Jul. 27, 2020.

Primary Examiner — Jong-suk (James) Lee
Assistant Examiner — Christopher E Dunay
(74) Attorney, Agent, or Firm — WPAT, PC

(57) ABSTRACT

A display panel includes an inner frame, a backlight module, an outer frame, and a light modulation module. The inner frame includes an inner surface forming a light guide plate accommodating area in a surrounding manner. The backlight module includes a light guide plate and a first optical film. The light guide plate is disposed in the light guide plate accommodating area, and the first optical film is carried on the inner frame. The outer frame includes a bottom portion and a sidewall portion that are connected to each other, in which the bottom portion and the sidewall portion form a receiving area, and the inner frame and the backlight module are located in the receiving area. The light modulation module is disposed on the first optical film. An orthogonal projection of the light modulation module in a vertical direction completely falls within the light guide plate accommodating area.

11 Claims, 5 Drawing Sheets

(56) References Cited

U.S. PATENT DOCUMENTS

| | | | |
|---|---|---|---|
| 2006/0126361 A1* | 6/2006 | Chang | G02B 6/0091 |
| | | | 362/631 |
| 2012/0069261 A1 | 3/2012 | Lee et al. | |
| 2013/0033657 A1* | 2/2013 | Li | G02F 1/133615 |
| | | | 349/60 |
| 2013/0044462 A1 | 2/2013 | Cheng | |
| 2015/0124195 A1* | 5/2015 | Chen | G02F 1/133615 |
| | | | 349/61 |
| 2015/0301273 A1 | 10/2015 | Huang et al. | |
| 2016/0037655 A1* | 2/2016 | Im | G02B 5/3033 |
| | | | 359/483.01 |
| 2016/0209579 A1* | 7/2016 | Park | G02B 6/0085 |
| 2016/0363721 A1* | 12/2016 | Choi | G02B 6/0091 |
| 2016/0363803 A1* | 12/2016 | Kim | G02F 1/133308 |
| 2017/0192289 A1* | 7/2017 | Won | G02F 1/133514 |
| 2018/0157117 A1* | 6/2018 | Jeong | G02B 6/0065 |
| 2018/0196310 A1* | 7/2018 | Ma | G02F 1/133608 |
| 2018/0231709 A1* | 8/2018 | Chen | G02F 1/133504 |
| 2019/0018274 A1* | 1/2019 | Baek | G02B 6/0043 |
| 2019/0121019 A1* | 4/2019 | Chen | G02B 6/0051 |
| 2019/0163012 A1* | 5/2019 | Han | G02F 1/133512 |

FOREIGN PATENT DOCUMENTS

| | | |
|---|---|---|
| CN | 104714332 A | 6/2015 |
| CN | 204387808 U | 6/2015 |
| CN | 205247016 U | 5/2016 |
| TW | 96128757 | 7/2012 |
| TW | 201307961 A | 2/2013 |
| TW | 100135581 | 4/2013 |
| TW | 201541155 A | 11/2015 |
| TW | 104218051 | 3/2016 |

\* cited by examiner

DISPLAY PANEL

FIELD OF THE INVENTION

The present invention relates to a display panel, and in particular, to a display panel including a backlight module

BACKGROUND OF THE INVENTION

A backlight module of a display panel usually includes a plurality of optical films disposed between a liquid crystal layer and a light source. Optical films can be classified into diffuser sheets, prism sheets, and reflectors. Optical films are used for making light emitted from a light source to be evenly incident onto the liquid crystal layer and then enhancing illumination efficiency utilizing reflection.

In the prior art, an optical film is often provided with protruding structures (lugs) on two opposite sides thereof to fix the position of the optical film. The widths of the protruding structures correspond to those of the notches made on the rubber gasket so that when the optical film is disposed on the light guide plate, the protruding structures can be accommodated in the notches of the rubber gasket, thereby fixing the optical film horizontally and vertically.

However, a liquid crystal layer of prior art is usually supported on both the optical film and the rubber gasket, with the edge of the liquid crystal layer being carried on the rubber gasket. Such structure causes uneven brightness phenomenon on the edge of the view area of the liquid crystal layer when outputting light, since in the protruding structures are too close to the view area. In addition, in a conventional liquid crystal display, the edge of the light guide plate is too close to the view area as well, which contributes to uneven brightness on the edge of the view area. Hence, display panels in the prior art still have disadvantages and room for improvement.

SUMMARY OF THE INVENTION

One embodiment of the present invention provides a display panel including an inner frame, a backlight module, an outer frame, and a light modulation module. The inner frame includes an inner surface, wherein the inner surface forms a light guide plate accommodating area in a surrounding manner. The backlight module includes a light guide plate and a first optical film, wherein the light guide plate is disposed in the light guide plate accommodating area, and the first optical film is supported on the inner frame. The outer frame includes a bottom portion and a sidewall portion that are connected to each other, wherein the bottom portion and the sidewall portion form an receiving area, and the inner frame and the backlight module are located in the receiving area. The light modulation module is disposed on the first optical film. An orthogonal projection of the light modulation module in a vertical direction completely falls within the light guide plate accommodating area.

Another embodiment of the present invention provides a display panel including an inner frame, a backlight module, an outer frame, and a light modulation module. The inner frame includes an inner surface, wherein the inner surface forms a light guide plate accommodating area in a surrounding manner. The backlight module includes a light guide plate and a first optical film, wherein the light guide plate is disposed in the light guide plate accommodating area, and the first optical film is supported on the inner frame. The outer frame includes a bottom portion and a sidewall portion that are connected to each other, wherein the bottom portion and the sidewall portion form an receiving area, and the inner frame and the backlight module are located in the receiving area. The light modulation module is disposed on the first optical film. The orthogonal projection of the light modulation module on the first optical film forms a first vertical projection scope thereon, and the orthogonal projection of the inner frame on the first optical film forms a second vertical projection scope thereon. The first vertical projection scope and the second vertical projection scope do not overlap.

In another embodiment of the present invention, a display panel is provided. The display panel includes an inner frame, a backlight module, an outer frame, and a light modulation module. The inner frame includes an inner surface, wherein the inner surface forms a light guide plate accommodating area in a surrounding manner. The backlight module includes a light guide plate and a first optical film, wherein the light guide plate is disposed in the light guide plate accommodating area, and the first optical film is supported on the inner frame. The outer frame includes a bottom portion and a sidewall portion that are connected to each other, wherein the bottom portion and the sidewall portion form an receiving area, and the inner frame and the backlight module are located in the receiving area. The light modulation module is disposed on the first optical film. The inner frame includes a first sidewall, the first optical film includes a first corner, a second corner, and a first side portion located between the first corner and the second corner, and the first side portion extends to the above of the first sidewall and is supported on a top end of the first sidewall.

In another embodiment of the present invention, a display panel is provided. The display panel includes an inner frame, a backlight module, an outer frame, and a light modulation module. The inner frame includes an inner surface, wherein the inner surface forms a light guide plate accommodating area in a surrounding manner. The backlight module includes a light guide plate and a first optical film, wherein the light guide plate is disposed in the light guide plate accommodating area, and the first optical film is supported on the inner frame. The outer frame includes a bottom portion and a sidewall portion that are connected to each other, wherein the bottom portion and the sidewall portion form a receiving area. The inner frame and the backlight module are located in the receiving area. The light modulation module is disposed on the first optical film. The first optical film and the second optical film each include a first side portion and a second side portion opposite to each other. The positions of the first side portion and the second side portion respectively correspond to two sides of the peripheral welding area, in which the first side portion and the second side portion are supported on the inner frame. The first optical film further includes a lug. The position of the lug corresponds to the peripheral welding area. The second optical film further includes an edge connected to the first side portion and the second side portion of the second optical film separately, and the lug of the first optical film protrudes from the edge of the second optical film.

DETAILED DESCRIPTION OF THE PREFERRED EMBODIMENTS

Embodiments of the present invention are described below with reference to FIG. 1 to FIG. 9. A person skilled in the art can understand the advantages and effects of the present invention from the description disclosed below. However, the content disclosed below is not intended to limit the protection scope of the present invention. The present invention can be implemented by a person skilled in the art based on different perspectives and applications without departing from the concept and spirit of the present invention. In addition, it should be stated in advance that the accompanying drawings of the present invention are merely used for illustration and are not drawn according to actual dimensions. Moreover, although terms, such as first, second, and third, may be used to describe various components, the component should not be limited by the terms. Said terms are used to distinguish different components.

First Embodiment

Figure 1:
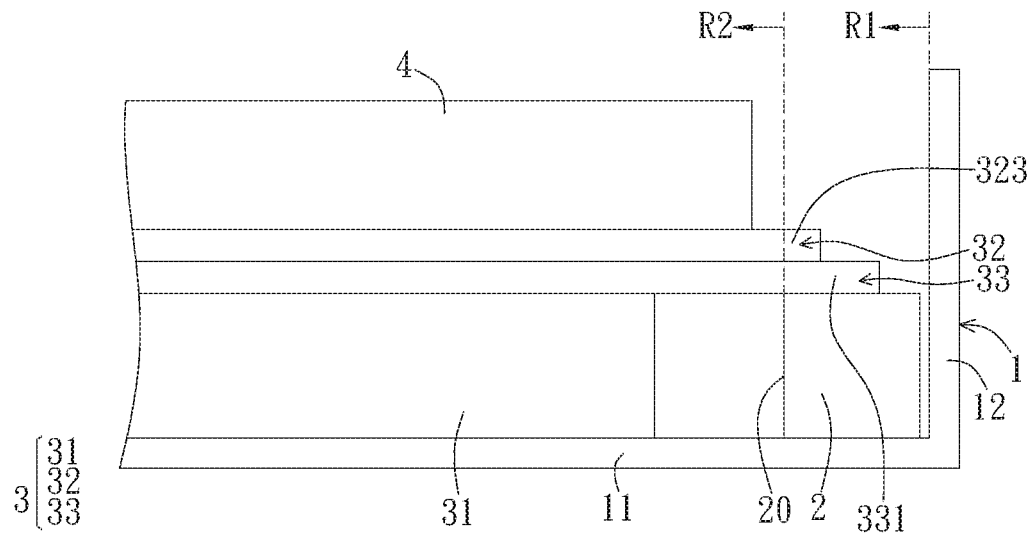
FIG. 1 is a partial cross-sectional view of a display panel according to a first embodiment of the present invention.
Figure 2:
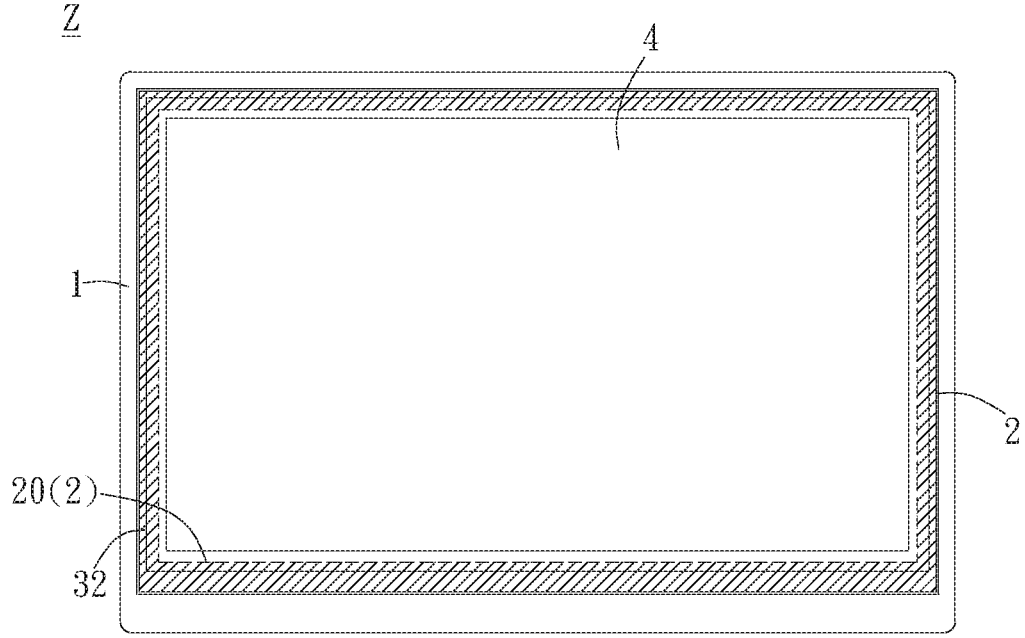
FIG. 2 is atop view of the display panel according to the first embodiment of the present invention.

Please refer to FIG. 1 and FIG. 2. FIG. 1 is a partial cross-sectional view of a display panel according to a first embodiment of the present invention, and FIG. 2 is a top view of the display panel according to the first embodiment of the present invention. In the first embodiment of the present invention, a display panel Z is provided. The display panel Z includes an outer frame 1, an inner frame 2, a backlight module 3, and a light modulation module 4. The outer frame 1 includes a bottom portion 11 and a sidewall portion 12 that are connected to each other, wherein the bottom portion 11 and the sidewall portion 12 form a receiving area R1. The inner frame 2 and the backlight module 3 are located in the receiving area R1. In this embodiment of the present invention, the outer frame 1 is made of a metal material, and the inner frame 2 is made of a polymer material, but the present invention is not limited thereto. In addition, the light modulation module 4 includes a light modulation material layer. The light modulation material layer is a liquid crystal layer or an electrophoresis molecular layer. However, the present invention is not limited thereto.

Furthermore, the inner frame 2 includes an inner surface 20, which surrounds and forms a light guide plate accommodating area R2. In the present embodiment, the inner frame 2 is a closed shape. However, in another embodiment, e.g. the third embodiment of this specification, the inner frame 2 is an open shape. The backlight module 3 includes a light guide plate 31, a first optical film 32, and a second optical film 33. The light guide plate 31 is disposed in the light guide plate accommodating area R2, the first side portion 323 of the first optical film 32 and the first side portion 331 of the second optical film 33 are supported on an upper surface of the inner frame 2. The light modulation module 4 is disposed on the first optical film 32. It should be noted that in the present embodiment, two optical films are used as an example. However, the quantity of the optical films in the backlight module 3 is not limited in the present invention. In another embodiment, the backlight module 3 includes the first optical film 32 as the only optical film. In addition, in the present embodiment, the first optical film 32 is made of a material having a relatively high expansion coefficient. Therefore, as shown in FIG. 1, the first optical film 32, compared with the second optical film 33, is farther away from the sidewall portion 12 of the outer frame 1 to prevent the first optical film 32 from abutting the outer frame after thermally expanding, which causes the change in the shape of the first optical film 32.

Figure 3:
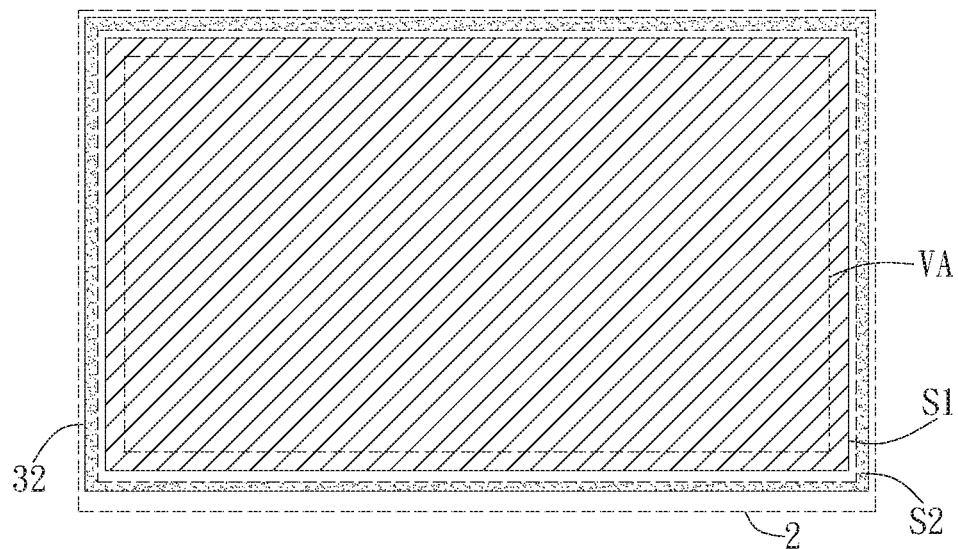
FIG. 3 illustrates a projection of the display panel according to the first embodiment of the present invention.

FIG. 3 is a schematic view of the projection of the display panel Z in a vertical direction according to the first embodiment of the present invention. In FIG. 3, only the projections of the inner frame 2, the first optical film 32, and the light modulation module 4 are shown. The other components of the display panel Z are omitted for the sake of brief illustration. One of the features of this embodiment of the present invention is that the orthogonal projection of the light modulation module 4 on the first optical film 32 forms a first vertical projection scope S1 on the first optical film 32. On the other hand, the orthogonal projection of the inner frame 2 on the first optical film 32 forms a second vertical projection S2 thereon, in which the first vertical projection S1 and the second vertical projection S2 do not overlap. To be specific, there is no overlapped area between the light modulation module 4 and the inner frame 2 in the vertical direction, as shown in FIG. 1. In other words, an orthogonal projection of the light modulation module 4 in the vertical direction completely falls within the light guide plate accommodating area R2 such that the edge of the light guide plate 31 is closer to the inner frame 2 compared to the light guide plate of prior art. In this way, the edge of the light guide plate 31 is distant from the view area VA of the light modulation module 4 so as to prevent uneven brightness at the edge of the view area VA of the light modulation module 4. Specifically, if the light modulation module 4 and the inner frame 2 overlap in the vertical direction, it means the inner frame 2 is closer to the center of the light modulation module 4 compared to the case in which the light modulation module 4 and the inner frame 2 do not overlap in the vertical direction. In the former case, expansion and contraction of the light guide plate 31 also need to be taken into consideration so that a gap of a proper range between the outer edge of the light guide plate 31 and the inner frame 2 can be reserved. Taking into consideration of the above-mentioned factors, the outer edge of the light guide plate 31 is closer to the center of the light modulation module 4 compared to the light guide plate 31 of the embodiment of FIG. 1, which results in light leakage on the side edge of the light modulation module 4. Therefore, in the present embodiment, the light modulation module 4 and the inner frame 2 are disposed to not overlap in the vertical direction to alleviate the light leakage problem.

Figure 4:
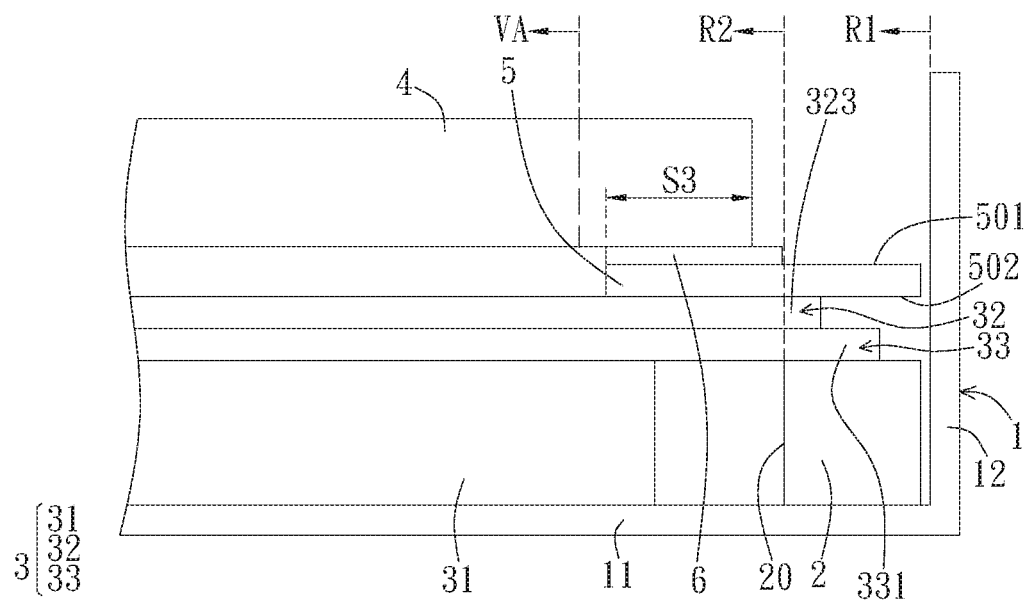
FIG. 4 is a partially enlarged cross-sectional view of a display panel according to a variant embodiment of the present invention.
Figure 5:
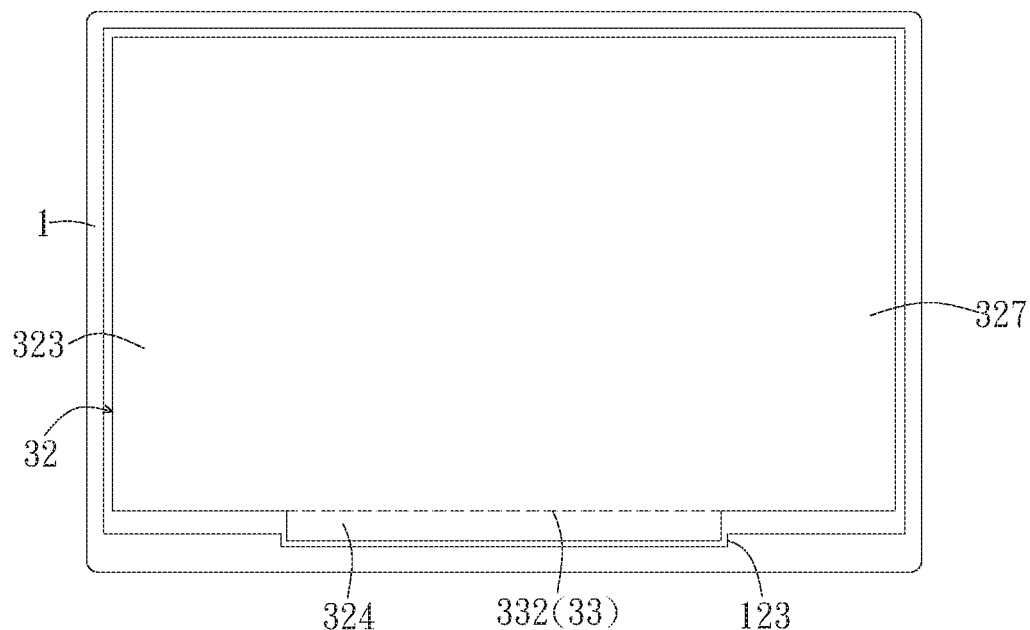
FIG. 5 is a schematic view of a display panel according to a second embodiment of the present invention.

FIG. 4 shows a variant embodiment based on the first embodiment, and FIG. 5 is a schematic view of the projection of the variant embodiment of FIG. 4. In this variant embodiment, the display panel Z further includes a spacer 5 and an adhesive layer 6. The spacer 5 is disposed between the light modulation module 4 and the first optical film 32, and the adhesive layer 6 is disposed between the spacer 5 and the light modulation layer 6 to fix the relative position between the light modulation layer 4 and the spacer 3. Specifically, the spacer 5 is made of a light shielding material. In addition, the vertical projection scope S3 of the spacer 5 on the light modulation module 4 is outside the view area VA to further reduce uneven brightness at the edge of the view area VA of the light modulation layer 4.

Furthermore, as shown in FIG. 4, the spacer 5 includes a first surface 501 and a second surface 502 that are opposite to each other. The first surface 501 faces the light modulation module 4, and the second surface 502 faces the first optical film 32. The adhesive layer 6 is disposed on the first surface 501 such that the adhesive layer 6 is located between the optical modulation module 4 and the spacer 5, and the spacer 5 is directly supported on the first optical film 32 through the second surface 502. In other words, the spacer 5 and the light modulation module 4 fix each other through the adhesive layer 6, and no adhesive layer is disposed between the spacer 5 and the first optical film 32 so that the spacer 5 and the first optical film 32 are not fixed to each other and movable relative to each other. In this way, scratches on the first optical film 32 caused by the spacer 5 can be prevented to avoid mura risk on the display panel Z. Referring to the embodiment of FIG. 2, the positioning of the first optical film 32 and the second optical film 33 can be achieved through the technical solution of this embodiment since the edge of the first optical film 32 and that of the second optical film 33 are carried on the inner frame 2, thus being limited by the outer frame 3. In this way, in the display panel Z of the present embodiment, the optical film does not need to be fixed to the inner frame and the light modulation module through an adhesive layer or an adhesive tape, thereby enhancing assembly efficiency and optimizing the optical effects.

Moreover, in the present embodiment, the spacer 5 is made of a compressible material such as foam or elastic plastic. The compression ratio of the compressible material in the vertical direction ranges from 5 to 15%. However, the present invention is not limited thereto. Damage to the first optical film 32 caused by the spacer 5 can be reduced through the use of compressible material to form the spacer 5.

By means of the foregoing structure, in the display panel Z of this embodiment of the present invention, the optical film is supported on the inner frame 2, and the light modulation module 4 is supported on the first optical film 32, in which the light modulation module 4 and the inner frame 2 do not overlap in the vertical direction, thereby reducing uneven brightness at the edge of the view area of a display panel caused by light concentrated at the edge the light guide plate. In addition, in the present embodiment, the first optical film 32 and the second optical film 33 do not have conventional lug structures on the left and right sides of the display panel Z so that the edges of the first optical film 32 and the second optical film 33 are directly supported on the inner frame 2 and limited by the outer frame 1, thereby alleviating the problem of uneven brightness on the edge of the display panel Z.

Second Embodiment

Referring to FIG. 5, the present embodiment differs from the first embodiment in that the first optical film 32 further includes a lug 324. For clear illustration, only the outer frame 1, the first optical film 32, and the second optical film 33 are shown in FIG. 5, and the other components are omitted. Specifically, the first optical film 32 and the second optical film 33 each include a first side portion 323 and a second side portion 327 opposite each other. In addition, the second optical film further includes an edge 332, and the edge 332 is connected to the first side portion 323 and the second side portion 327. Referring to FIG. 5, when the first optical film 32 and the second optical film 33 are stacked together, the first side portion 323 of the first optical film 32 corresponds to the first side portion (referring to FIG. 7, the first side portion 331 of the second optical film 33) of the second optical film 33, and the second side portion 327 of the first optical film 32 corresponds to the second side portion (referring to FIG. 7, the second side portion 333 of the second optical film 33) of the second optical film 33 in a manner such that the lug 324 of the first optical film 32 corresponds to the edge 332 of the second optical film 33. In this way, when observing the contour of the two stacked-together optical film 32, 33, the lug 324 of the first optical film 32 protrudes from the edge 332 of the second optical film 33. As shown in the embodiment of FIG. 5, the outer frame 1 further includes a groove structure 123, the position of which corresponds to that of the lug 324 so as to accommodate the lug 324. In this way, the first optical film 32 is limited by the lug 324 and the groove structure 123. Specifically, the backlight module of the display panel Z further includes a plurality of light sources (for example, the light source L in FIG. 7), and the position of the lug 323 of the first optical film corresponds to that of the light sources in a manner to replace conventional lugs on two sides of the optical films, thereby increasing optical effects and optimizing optical reliability.

Third Embodiment

Figure 6:
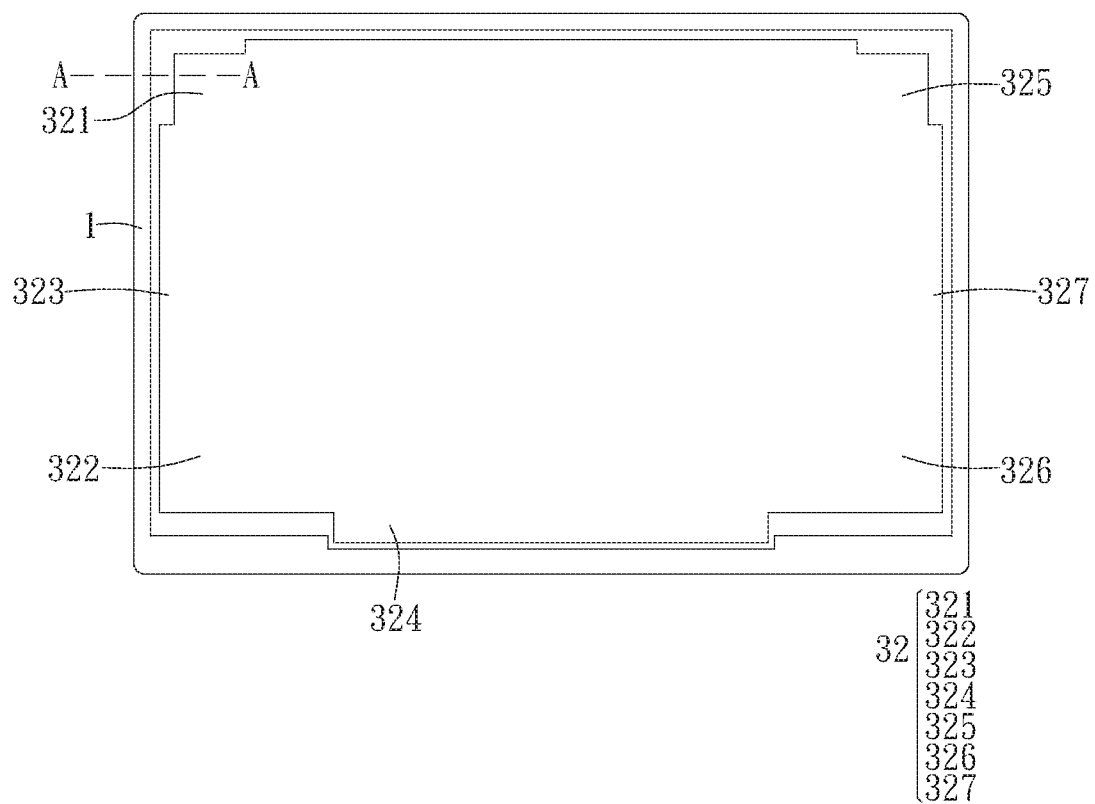
FIG. 6 is a schematic view of a display panel according to a third embodiment of the present invention.
Figure 7:
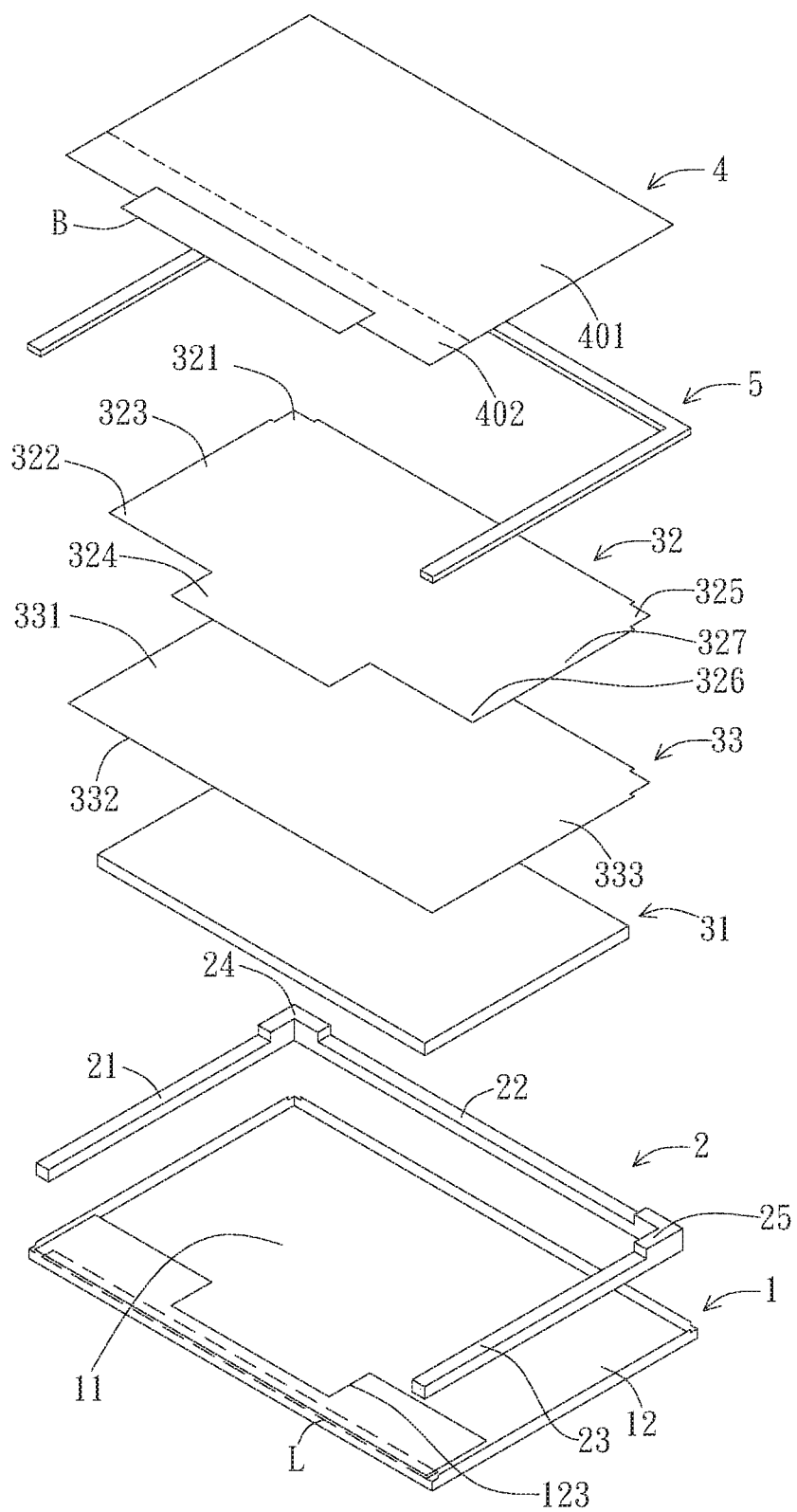
FIG. 7 is an exploded view of the display panel according to the third embodiment of the present invention.
Figure 8:
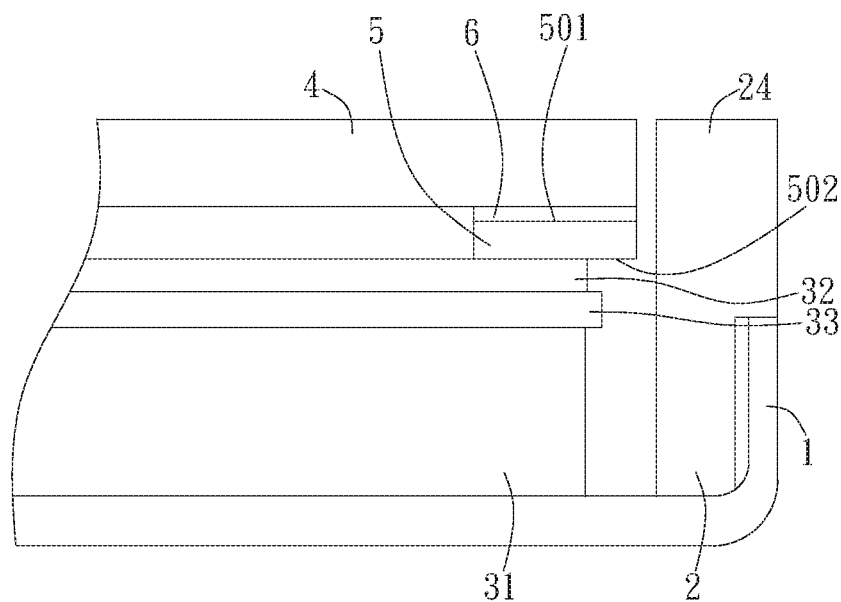
FIG. 8 illustrates a partial cross section of the display panel shown in FIG. 6 along the line A-A.
Figure 9:
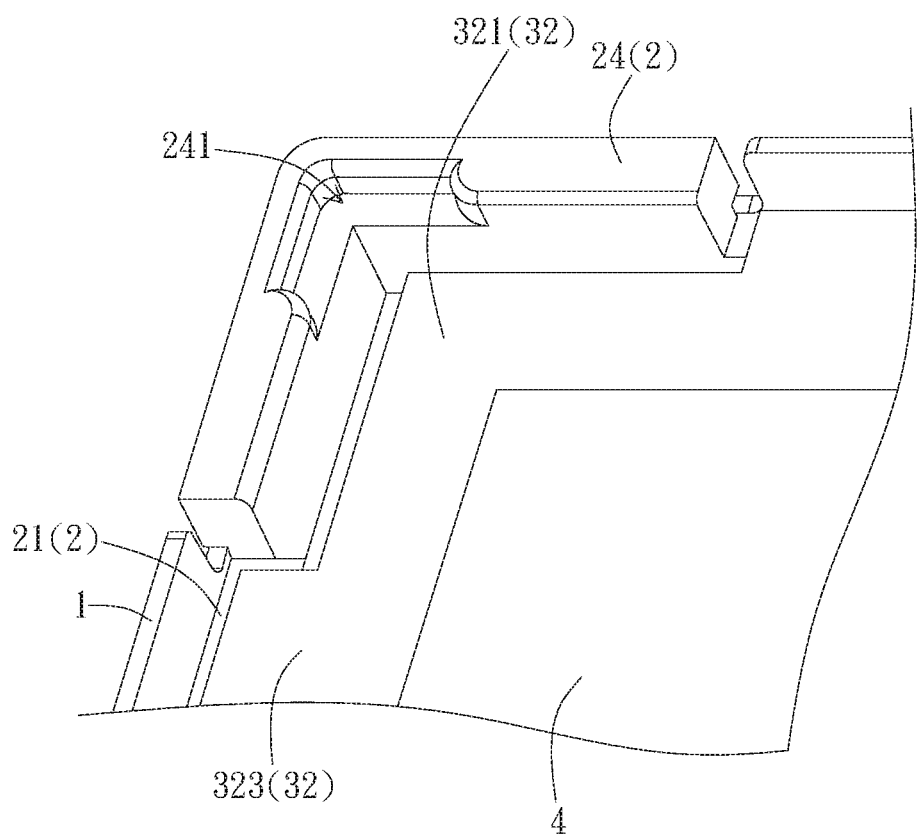
FIG. 9 is a partially enlarged view of the display panel according to the third embodiment of the present invention.

Referring to FIG. 6 to FIG. 9, a third embodiment of the present invention provides a display panel Z. FIG. 6 is a schematic view of the display panel Z according to the third embodiment, FIG. 7 is an exploded view of the display panel Z according to the third embodiment, FIG. 8 is a schematic view of a partial cross section along an A-A line in FIG. 6, and FIG. 9 is a partially enlarged cross-sectional view of the display panel Z according to the third embodiment of the present invention. For clear illustration, only the outer frame 1 and the first optical film 32 are shown in FIG. 6, and the remaining components are omitted. In the present embodiment, the light modulation module 4 includes a view area 401 and a peripheral welding area 402 that are adjacent to each other. The light source L of the display panel Z corresponds to the peripheral welding area 402 and is enclosed by the outer frame 1. The position of the lug 324 corresponds to the peripheral welding area 402.

To be specific, referring to FIG. 8, the first side portion 323 and the second side portion 327 of the first optical film 32 respectively correspond to two sides of the peripheral welding area 402. Similarly, the first side portion 331 and the second side portion 333 of the second optical film 33 respectively correspond to two sides of the peripheral welding area 402. The peripheral welding area 402 covers the lug 324 of the first optical film 32 and the outer frame 1 so as to further fix the position of the light modulation module 4. In the present embodiment, the display panel Z include a circuit board B disposed on the peripheral welding area 402 to drive the light modulation module 4. Specifically, the position of the lug of the first optical film 32 corresponds to the peripheral welding area 402 or the light source L so that optical effects can be enhanced, and optical reliability can be optimized.

Referring to FIG. 7, FIG. 8, and FIG. 9, the present embodiment differs from the second embodiment in that the inner frame 2 includes a first sidewall 21, a second sidewall 22, a third sidewall, and a first corner protection member 24. The first corner protection member 24 is located on one end of the first sidewall 21, and the top end of the first corner protection member 24 extends upwards such that the height thereof exceeds that of the top of the first sidewall 21. In other words, the first sidewall 21 and the first corner protection member 24 have different thicknesses so as to form a stepped structure. In the present embodiment, the first optical film 32 includes a first corner 321 and a second corner 322 respectively located on two ends of the first side portion 323 so that the first side portion 323 is located between the first corner 321 and the second corner 322. In the present embodiment, the first side portion 323 of the first optical film 32 extends to the above the first sidewall 21 of the inner frame 2, and is supported on the first sidewall 21 of the first side portion 323. The corner of the light modulation module 4 is adjacent to the first corner protection member 24. In the present embodiment, the position of the first corner 321 of the first optical film 32 corresponds to that of the first corner protection member 24, and the edge of the first corner 321 extends backwards relative to the outer edge of the first side portion 323 towards the geometric center of the first optical film 32, to provide an accommodating space for the first corner protection member 24.

The structure of the present invention is described above with reference to the first sidewall 21, the first corner 321, the second corner 322, and the first corner protection member 24. However, it should be understood that the display panel Z is approximately a symmetric structure. Therefore, the display panel Z further includes a second corner protection member 25, a third corner 325, and a fourth corner 326 correspondingly, wherein the third corner 325 and the fourth corner 326 are located on two ends of the second side portion 327 of the first optical film. The structure of the third corner 325 corresponds to that of the first corner 321. To be specific, the third corner 325 corresponds to the second corner protection member 25 and has an edge that extends backwards. The inner frame 2 further includes a second sidewall 22 and a third sidewall 23. The upper surface of the second sidewall 22 and that of the third sidewall 23 respectively carry the side edges and second side portions (327, 333) of the first optical film 32 and the second optical film 33.

By means of the aforementioned structure, in the present embodiment, the outer edges of the first corner 321 and the third corner 325 of the first optical film 32 extend backwards towards the geometric center of the first optical film 32 to receive the first corner protection member 24 and the second corner protection member 25, which prevents the corners of the light modulation module 4 from being damaged due to collision between the light modulation module 4 and the inner frame 2. Moreover, in the embodiment of FIG. 9, the first corner protection member 24 of the inner frame 2 includes a receiving groove 241. Specifically, the first corner protection member 24 is partially hollowed to form the reserved receiving 241, which corresponds to the corner of the light modulation module 4. In this way, the receiving groove 241 serves as a buffer space for the corner of the light modulation module 4 to prevent the light modulation module from damaged.

In summary, the display panel provided by the embodiments of the present invention enable that "an orthogonal projection of the light modulation module in the vertical direction completely falls within the light guide plate accommodating area" by the technical solutions of "the first optical film is supported on the inner frame" and "the light modulation module is disposed on the first optical film".

In addition, the first optical film and the second optical film of the display panel of the embodiments of the present invention are supported on the inner frame, and the light modulation module is supported on the first optical film 32, in which the light modulation module and the inner frame do not overlap in the vertical direction, thereby alleviating uneven brightness at the edge of the view area of the display panel caused by light concentrated at the edge of the light guide plate. In addition, in the present embodiment, the first optical film and the second optical film dispense with conventional protruding structures (lugs) on side edges of the display panel (e.g. the left and right hand side edges of the optical films, with the peripheral welding area being a center reference) so that the first side portions and the second side portions of the optical films can be supported on the inner frame and be limited by the outer frame, thereby alleviating the problem of uneven brightness at the edges of the display panel caused by lug structure in the prior art.

The present invention has been described with reference to the above embodiments, but the above embodiments are merely examples for implementing the present invention. It should be noted that the disclosed embodiments are not intended to limit the scope of the present invention. On the contrary, any modification and equivalent configuration within the spirit and scope of the appended claims shall fall within the scope of the present invention.

What is claimed is:
1. A display panel, comprising:
   an inner frame, including an inner surface, wherein the inner surface forms a light guide plate accommodating area in a surrounding manner;
   a backlight module, including a light guide plate and a first optical film, wherein the light guide plate is disposed in the light guide plate accommodating area, and the first optical film is supported on the inner frame;
   an outer frame, including a bottom portion and a sidewall portion that are connected to each other, wherein the bottom portion and the sidewall portion form an receiving area, and the inner frame and the backlight module are located in the receiving area; and
   a light modulation module, disposed on the first optical film,
   wherein an orthogonal projection of the light modulation module in a vertical direction completely falls within the light guide plate accommodating area;
   wherein the orthogonal projection of the light modulation module on the first optical film forms a first vertical projection scope thereon, and the orthogonal projection of the inner frame on the first optical film forms a second vertical projection scope thereon, wherein the first vertical projection and the second vertical projection do not overlap.

2. The display panel according to claim 1, further comprising:
   a spacer, disposed between the light modulation module and the first optical film; and
   an adhesive layer, disposed between the spacer and the light modulation module to fix the relative position between the light modulation module and the spacer.

3. The display panel according to claim 2, wherein the light modulation module includes a view area, and a vertical projection scope of the spacer on the light modulation module is outside the view area.

4. The display panel according to claim 1, wherein the inner frame includes a first sidewall, the first optical film includes a first corner, a second corner, and a first side portion located between the first corner and the second corner, and the first side portion extends to the above of the first sidewall and is supported on the top of the first sidewall.

5. The display panel according to claim 4, wherein the light modulation module further includes a view area and a peripheral welding area that are adjacent to each other, the display panel further includes a circuit board, and the circuit board is disposed on the peripheral welding area, wherein the position of the first side portion corresponds to either of two sides of the peripheral welding area.

6. The display panel according to claim 4, wherein the inner frame includes a first corner protection member located on an end of the first sidewall, and the top of the first corner protection member extends upwards such that the height thereof exceed that of the top of the first sidewall, wherein the location of the first corner corresponds to that of the first corner protection member, and the outer edge of the first corner extends backwards relative to the outer edge of the first side portion towards a geometric center of the first optical film.

7. The display panel according to claim 6, wherein the part of the edge of the light modulation module that corresponds to the first corner is adjacent to the first corner protection member.

8. The display panel according to claim 1, further comprising:
a spacer, including a first surface and a second surface that are opposite to each other, wherein the first surface faces the light modulation module, and the second surface faces the first optical film; and
an adhesive layer, disposed on the first surface such that the adhesive layer is located between the light modulation module and the spacer,
wherein the spacer is directly supported on the first optical film with the second surface thereof faces the first optical film.

9. The display panel according to claim 8, wherein the spacer is a compressible material, and a compression ratio of the spacer in the vertical direction ranges from 5% to 15%.

10. A display panel, comprising:
an inner frame, including an inner surface, wherein the inner surface forms a light guide plate accommodating area in a surrounding manner;
a backlight module, including a light guide plate and a first optical film, wherein the light guide plate is disposed in the light guide plate accommodating area, and the first optical film is supported on the inner frame;
an outer frame, including a bottom portion and a sidewall portion that are connected to each other, wherein the bottom portion and the sidewall portion form an receiving area, and the inner frame and the backlight module are located in the receiving area; and
a light modulation module, disposed on the first optical film,
wherein the orthogonal projection of the light modulation module on the first optical film forms a first vertical projection scope thereon, and the orthogonal projection of the inner frame on the first optical film forms a second vertical projection scope thereon, wherein the first vertical projection and the second vertical projection do not overlap.

11. A display panel, comprising:
an inner frame, including an inner surface, wherein the inner surface forms a light guide plate accommodating area in a surrounding manner;
a backlight module, including a light source, a light guide plate, a first optical film, and a second optical film, wherein the light guide plate is disposed in the light guide plate accommodating area, the first optical film is supported on the inner frame, and the second optical film is located between the first optical film and the light guide plate;
an outer frame, including a bottom portion and a sidewall portion that are connected to each other, wherein the bottom portion and the sidewall portion form an receiving area, and the inner frame and the backlight module are located in the receiving area; and
a light modulation module, including a view area and a peripheral welding area that are adjacent to each other, wherein the light modulation module is disposed on the first optical film, and the position of the light source corresponds to the peripheral welding area,
wherein the first optical film and the second optical film each include a first side portion and a second side portion opposite each other, in which the positions of the first side portion and the second side portion respectively correspond to two sides of the peripheral welding area, and the first side portion and the second side portion are supported on the inner frame, and
wherein the first optical film further includes a lug, the position of the lug corresponds to the peripheral welding area, and the second optical film further includes an edge connected to the first side portion and the second side portion of the second optical film respectively, the lug of the first optical film protruding from the edge of the second optical film.

* * * * *